3,218,369
BLEND OF BROMINATED POLYGYLCIDYL ETHER, A LIQUID EPOXYCYCLOHEXANE RESIN AND A LIQUID ALIPHATIC POLY-GLYCIDYL ETHER

James R. Hinkley, St. Paul, Minn., assignor to Minnesota Mining and Manufacturing Company, St. Paul, Minn., a corporation of Delaware
No Drawing. Filed Jan. 6, 1961, Ser. No. 80,514
8 Claims. (Cl. 260—830)

The present application is a continuation-in-part of my copending application Serial No. 3,487 filed January 20, 1960, now abandoned.

This invention relates to liquefied compositions of normally solid, halogenated epoxy resin which harden upon heating to a strong, tough, flame-retardant cured state. The novel compositions are particularly adapted for impregnating and embedding electrical components since their viscosity is such, especially when warmed, that they readily penetrate the minute interstices of fine electrical coils and other elements of electrical networks.

The presence of bromo or chloro groups in thermosetting resin compositions is known to impart flame-retardancy to cured products thereof. The degree of flame-retardancy thus imparted depends primarily upon the proportion of bromo or chloro groups, but the higher the proportion, the higher the melting point of the composition, with the result that those halogenated resins which provide a useful degree of flame retardancy are solids. Since the primary utility for flame-retardant resins is for electrical encapsulation where free-flowing liquids are much desired, the use of solid halogenated thermosetting resins has heretofore been somewhat restricted due to the lack of really good liquefying means. However these resins are liquefied, it is essential for casting uses that substantially no volatile matter be given off in curing, so that the cured composition is void-free. Moreover, the cured product must be strong and tough and should provide good electrical insulation.

Since self-curing liquid casting resin compositions are not completely stable at room temperature, it is necessary to market them in two separate parts for mixing by the ultimate consumer shortly before use. It is also important that each of the two parts be a liquid so that the two may be simply stirred together by the ultimate consumer. Thus, the part which includes the high-melting halogenated resin must include a nonvolatile liquefying agent, and the mixture must be stable for months and should remain liquid for at least 6 months at room temperature.

My invention concerns two-part liquid casting resin compositions which are based on high-melting epoxy resin which is polyglycidyl ether of a polynuclear phenol having a plurality of bromo groups, or alternatively chloro groups, directly attached to nuclear carbon atoms, which ether is free from functional groups other than hydroxyl and epoxy groups. Such a resin may be prepared by reacting epichlorohydrin and brominated bisphenol, i.e., 2,2-bis(4-hydroxy - 3,5-dibromophenyl) propane, as follows:

BROMINATED POLYGLYCIDYL ETHER

Five hundred ninety grams (6.4 moles) of epichlorohydrin and 544 grams (1.0 mole) of brominated bisphenol were charged to a two-liter flask and stirred until the phenol had dissolved. Eighty grams (2 moles) of sodium hydroxide were dissolved in 320 grams of methyl alcohol. The solution of the brominated bisphenol in the epichlorohydrin was raised to 65° C. and 20 cc. of the alcoholic base were added. After stirring for 1 hour at 65° C. the remaining alcoholic base was added dropwise over a 3–4 hour period. The reaction mixture was refluxed for an additional hour and the precipitated salt was filtered off. The filtrate was stripped by one-plate distillation up to 130° C. at 10 mm. Hg. The product of 594.5 grams of hard, light-colored resin was a brominated polyglycidyl ether having a Durrans' softening point of about 45–50° C. and an oxirane oxygen content of 4.4%. The epoxide equivalent was about 364.

One means which I have developed for stably liquefying such high-melting halogenated epoxy resin is by admixing therewith a polycarboxylic acid anhydride having a melting point not greater than about 40° C., which anhydride is an adduct of maleic anyhdride and olefin. Among such anhydrides are methylendomethylene-tetrahydrophthalic anhydride (a light yellow semi-viscous liquid with a viscosity of 138.4 cps. at 25° C. available commercially as "Methyl Nadic Anhydride"). Another is the adduct of myrcene and maleic anhydride which may be prepared as follows: maleic anhydride (34.6 lbs.) is charged to the reaction vessel and heated to 145° F. Myrcene (64 lbs.) is added slowly to the vessel, and the temperautre of the reactants is maintained below 150° F. until all the myrcene is added. After the addition of myrcene is completed, the reaction vessel is heated to 200° F. for two hours. It is then permitted to cool to 150° F., at which temperature the pressure in the vessel is slowly reduced to 20–30 mm., after which the temperature is raised to 300° F. When all the distillate has been removed in this manner, the reaction vessel is cooled to 175° F., and the reaction product, myrcene-maleic anhydride adduct, is drained into a storage container.

A group of polycarboxylic acid anhydrides which have particular utility in my invention because they form admixtures of especially low viscosity are the alkenyl succinic anhydrides such as tetrapropenyl succinic anhydride which is prepared by heating together equimolar proportions of maleic anhydride and olefin which is primarily the tetramer of propylene.

Sufficient of the low-melting anhydride is mixed with the high-melting halogenated epoxy resin to produce upon simple admixture therewith a viscosity of less than 80,000 cps. at room temperature. The second part of the two-part system may also include polycarboxylic acid anhydride so that the total system includes 0.5 to 2 anhydride groups per epoxy group. Also, the second part necessarily includes a catalyst in such amount that the mixture of the two parts cures fully within a reasonable time at moderately elevated temperatures, e.g., overnight at 125°–150° C. In most cases the catalyst comprises less than 5% of the total weight of epoxy resin and anhydride in the system, and 0.1 to 2% is usually sufficient. Suitable catalysts include basic tertiary amines such as dimethylbenzyl amine and salts thereof, and Lewis acids such as boron trifluoride and stannic chloride.

Each part of the self-curing composition may include other materials such as finely divided fillers or thixotropic agents, pigments, flexibilizing co-reactants and reactive diluents. For example, the resin-containing component may include nonhalogenated epoxy resins such as liquid condensation products of epichlorohydrin and bisphenol A, typical of which is "Epon 828" which has a Durrans' softening point of about 10° C. and an epoxide equivalent of about 190. Another class of useful liquid epoxy resins is the epoxidized novolacs typified by the epoxy resin marketed by the Borden Co. as "Epiphen 849," which is stated by the manufacturer to have a viscosity at 25° C. of 10,000–20,000 cps. and an epoxide equivalent of 180–200 and to have the structure

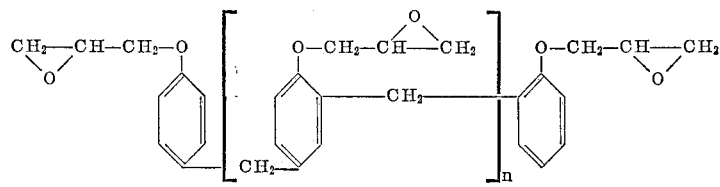

Another means which I have developed for stably liquefying halogenated epoxy resins such as the brominated polyglycidyl ether is by admixing therewith certain liquid epoxy resins. For example, a mixture of 60 parts by weight of the above-described "Epon 828" epoxy resin and 40 parts of brominated polyglycidyl ether has a viscosity of 252,000 cps., but this is somewhat high for use as an electrical casting resin. At 30 parts of the brominated polyglycidyl ether to 70 parts of "Epon 828," the viscosity is 32,000 cps. and remains at that level during long storage. However, it is preferred to employ a higher proportion of the halogenated resin in uses requiring flame retardancy.

Better liquid epoxy resins from the viewpoint of permitting a higher proportion of halogenated resin while keeping the viscosity low are epoxycyclohexane resins typified by the resin marketed by Union Carbide Chemicals Co. as "EP–201" which has the formula

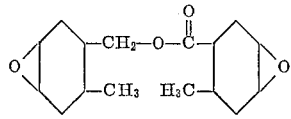

This resin in admixture with equal parts with the brominated polyglycidyl ether provides a viscosity of 12,000 cps. which does not advance appreciably on storage, while at a ratio of 40 parts of this resin to 60 parts of brominated polyglycidyl ether, the viscosity is 270,000 cps.

Another epoxy resin which provides liquid admixtures with the brominated polyglycidyl ether is marketed by Dow Chemical Co. as resin "X–2673.6." This resin is an aliphatic polyglycidyl ether having a viscosity at 25° C. of 50 cps. and an epoxide equivalent of 195. Equal parts of this resin and of the brominated polyglycidyl ether provide a viscosity of only 1000 cps.; at 40:60 ratio, the viscosity is 2600 cps.; and at 30:70 ratio, the viscosity is 12,000 cps. However, the mixtures containing 60 and 70 parts of the brominated polyglycidyl ether completely crystallize within about a week, and the mixture at equal parts experiences some crystallization on standing for a week and must be warmed before use to remelt the crystals.

Surprisingly, it has been found that mixtures of 50 parts or more of the brominated polyglycidyl ether with up to 50 parts of a mixture of liquid aliphatic polyglycidyl ether and liquid epoxycyclohexane resin provide stable mixtures of low viscosity, and because of the high halogen content, these compositions provide cured products of excellent flame retardancy. A mixture of 60 parts of the brominated polyglycidyl ether, 30 parts of the "X–2673.6" aliphatic polyglycidyl ether, and 10 parts of "EP–201" epoxycyclohexane resin has a stable viscosity of only 5260 cps. at 25° C., and the same resins at 60:20:20 proportion afford a stable viscosity of 13,600 cps. The utility of such a composition as an electrical casting resin is shown hereinbelow in Example 5.

Example 1

To 66.6 grams of the above-described brominated polyglycidyl ether was added 33.4 grams of methyl-endomethylene-tetrahydrophthalic anhydride. This mixture had an initial viscosity of 71,500 cps. at room temperature and had advanced to only 78,000 cps. after 48 days. The same mixture had an initial viscosity of 2350 cps. at 49° C. and had advanced to 13,4000 cps. after 72 days at that temperature. With addition of 0.5 gram of tris(2,4,6-dimethylaminomethyl)phenol, the freshly-prepared mixture cured in an oven in 3 hours at 120° C. The cured resin had a Barcol hardness of 44.

A specimen of the cured resin was tested for self-extinguishing properties on the Manson Flammability Tester according to the proposed SG–5, Exhibit "A," January 14, 1954, standards of the NEMA Power and Switchgear Assemblies Committee. Essentially the test consists of heating a specimen of the resin with a high temperature coil until gases given off from the resin are ignited by two continuously energized spark plugs which are situated near the specimen. The time required for this is recorded as the ignition time. The heating is continued for an additional 30 seconds after ignition. The time after this additional heating until all burning ceases is recorded as the burning time. The results are given as a ratio of burning time to ignition time, 0.105 for this specimen, an exceptionally low value.

The test was repeated using an otherwise identical cured specimen, except that talc comprised 35% of the composition and antimony trioxide comprised 5%, with essentially the same result in the flammability test.

Comparative example

For purposes of comparison, the brominated polyglycidyl ether was replaced by a conventional liquid epoxy resin, specifically "Epon 828." This resin is a condensation product of epichlorohydrin and bisphenol A, has a Durrans' softening point of about 10° C. and an epoxide equivalent of about 190.

This epoxy resin, in an amount of 54.5 grams, was mixed with 45.5 grams of methyl-endomethylene-tetrahydrophthalic anhydride and 0.5 gram of tris(2,4,6-dimethylaminomethyl)phenol and cured for 3 hours at 120° C. The Barcol hardness of the cured product was 41. In the flammability test described in Example 1, the ratio of burning time to ignition time was 6.05. The addition of talc in an amount to comprise 40% of the uncured composition reduced the self-extinguishing ratio of the cured product to 1.93.

Example 2

The uncured composition of Example 1 is somewhat high in viscosity for good impregnation of electrical components, and for many casting resin applications it is preferred to use a polycarboxylic acid anhydride which provides lower viscosity admixtures with brominated polyglycidyl ether, e.g., the adduct of myrcene and maleic anhydride described hereinabove. A composition of 62 grams of the brominated polyglycidyl ether and 31.5 grams of the myrcene-maleic anhydride adduct has an initial viscosity of 12,000 cps. and advances to the still pourable viscosity of about 70,000 cps. after storage at room temperature for six months. When a mixture of 6.5 grams of methyl-endomethylene-tetrahydrophthalic anhydride and 0.5 gram of tris(2,4,6-dimethylaminomethyl)phenol is added, the composition cures in 3 hours at 120° C. to a Barcol hardness of 34. The cured product has a self-extinguishing ratio of 1.15 in the flammability test of Example 1.

An otherwise identical composition comprising 35% talc and 5% antimony trioxide provides an extinguishing ratio of only 0.34.

*Example 3*

Sixty-five grams of the brominated polyglycidyl ether were melted together with 35 grams of the myrcene-maleic anhydride adduct. Upon cooling to room temperature, this composition gave a liquid mixture of 6800 cps. viscosity. After aging for 52 days at room temperature, the viscosity had increased to 11,600 cps. It is estimated this mixture will remain pourable for over six months if stored at room temperature. At 50° C. the initial viscosity of this mixture was 650 cps. and after about 71 days at this temperature it was 3500 cps.

To 200 grams of this mixture were added 80 grams of the acid-terminated polyester of 1.68 moles of maleic anhydride and one mole of polypropylene glycol of 1025 average molecular weight. As catalyst was added 1.6 grams of tris(2,4,6-dimethylaminomethyl)phenol. The mixture was then poured into an aluminum mold containing the ⅛-inch thermal shock insert described in "Thermal Shock Tests for Casting Resins," a paper presented by M. Olyphant to the "First National Conference on the Application of Electrical Insulation," at Cleveland, Ohio, September 3–5, 1958. A tough, adherent, rubbery casting was obtained after three hours in an oven at 120° C.

The cured sample was heated in an oven to 130° C. for 30 minutes and then plugged into a liquid bath at −55° C. and held there for 10 minutes, but did not crack. The test was repeated nine more times, with just enough delay to allow inspection of the sample for cracks after each cold immersion, but no crack developed. Thus, the casting resin of this example is well suited for encapsulating uses where wide ranges in temperature may be encountered, e.g., in aircraft or missiles.

The same composition made up to comprise 35% talc and 5% antimony trioxide and cured around a ¼-inch thermal shock insert withstood the same thermal shock test without cracking.

A cured specimen of the unfilled composition gave a self-extinguishing ratio of 6.05 in the above-described flammability test, while a cured specimen of the filled composition produced a ratio of 1.17. Although these results may seem somewhat high, they are very good for a liquid composition which cures to a tough, flexible state. Specimens cured for 3 hours at 120° C. from the filled composition showed a weight loss from 10 days' exposure to 120° C. in an air-circulating oven of 0.8%, compared to 1.5% for the cured unfilled composition, and showed a water absorption after 10 days total immersion at room temperature of 0.75%, compared to 1.1% for the cured unfilled composition. Electrical characteristics of the cured filled composition measured at 25° C. were as follows:

Dielectric strength (ASTM D149–44) 50 mil sample volts per mil _____ 600
Volume resistivity (ASTM D257–49T) ohm/cm. _____ $1.1 \times 10^{12}$
Dissipation factor (at 1000 cycles):
   Initial _____ 0.08
   After 10 days at 120° C. _____ 0.05
Dielectric constant (at 1000 cycles):
   Initial _____ 6.1
   After 10 days at 120° C. _____ 6.3

*Example 4*

The composition of the preceding example was varied by replacing portions of the brominated polyglycidyl ether with conventional epoxy resin, specifically "Epon No. 828." In each case, the quantity of freshly prepared anhydride adduct was adjusted to provide 85 anhydride groups for each 100 epoxy groups. For each variation, the viscosity of only the epoxy resins plus the anhydride adduct was measured at 25° C. and noted in the table below as "Viscosity of Part A." Then the acid-terminated polyester was added in an amount to provide 15 carboxyl groups per 100 epoxy groups along with tris(2,4,6-dimethylaminomethyl)phenol in an amount equal to 0.5% of the total reactive ingredients. Also added were 35% talc and 5% antimony trioxide based on total weight of composition. Specimens of each composition cured for three hours at 120° C. were subjected to the flammability test, and the self-extinguishing ratios are noted in the table.

| Ingredients of Part A | | | Viscosity of Part A in cps. | Self-estinguishing ratio |
| --- | --- | --- | --- | --- |
| Brominated Polyglycidyl Ether | "Epon 828" | Anhydride adduct | | |
| 100 | 0 | 54 | 6800 | 1.17 |
| 50 | 50 | 77 | 1200 | 1.37 |
| 40 | 60 | 82 | 950 | 1.71 |
| 30 | 70 | 86 | 750 | 2.26 |
| 20 | 80 | 90 | 650 | 3.93 |
| 0 | 100 | 100 | 450 | 4.70 |

*Example 5*

A two-part stable liquid composition was made up as follows:

Part A

Parts by weight
Brominated polyglycidyl ether _____ 53.2
Aliphatic polyglycidyl ether (Dow "X–2673.6") ___ 26.6
Epoxycyclohexane resin ("EP–201") _____ 8.8
Talc _____ 78.4
Brown pigment _____ 4.0

Part B

Tetrapropenyl succinic anhydride _____ 80.0
Acid-terminated polyester of Example 3 _____ 31.0
Tris(2,4,6-dimethylaminomethyl)phenol _____ 0.4
Antimony trioxide _____ 16.3
Talc _____ 39.0

The high proportion of talc in Part A rendered that mixture thixotropic so that its viscosity exceeded 2 million centipoises (maximum scale reading on the measuring instrument), although Part A became much less viscous when stirred. The viscosity of Part B was 3,000 cps. Part B was readily blended into the thixotropic liquid Part A simply by stirring equal parts of the two together at room temperature to provide a self-curing composition of 10,000 cps. viscosity.

When cured for 3 hours at 120° C. around a thermal shock insert as described in Example 3, no cracks appeared in the resin in the thermal shock test.

Other cured specimens exhibited an average self-extinguishing ratio of 1.6 in the flammability test of Example 1.

Electrical characteristics of the cured composition measured at various temperatures at a frequency of 1000 cycles were:

| | At RT | At 90° C. | At 105° C. |
| --- | --- | --- | --- |
| Dissipation factor | 0.06 | 0.09 | 0.21 |
| Dielectric constant | 4.8 | 6.3 | 6.3 |

In addition to utility as casting resin, some of the novel compositions of the foregoing examples are useful as wire insulation and may also be used to saturate a fibrous web such as glass cloth which may be wound around an electrical component and cured in contact therewith to provide tough flame-retardant electrical insulation.

While the above-described brominated polyglycidyl ether is employed in each of the working examples, a portion or all of that resin may be replaced in the practice of this invention by polyglycidyl ether of polynuclear phenol having in place of the bromo groups a plurality of other halogen substituents directly attached to nuclear carbon atoms. However, bromo substituents are much preferred.

I claim:

1. A low viscosity, stable blend of epoxy resins which forms heat-curable admixtures with polycarboxylic acid anhydride and tertiary amine catalyst for the production of strong tough flame-retardant cured products, said blend comprising (1) at least 50% by weight of a polyglycidyl ether of a polynuclear phenol having a plurality of bromo groups directly attached to nuclear carbon atoms, said ether being free from functional groups other than hydroxyl and epoxy groups, (2) at least 20% of a liquid aliphatic polyglycidyl ether, and (3) a minor amount up to 20% of a liquid epoxycyclohexane resin.

2. A low viscosity, stable blend of epoxy resins which forms heat-curable admixtures with polycarboxylic acid anhydride and tertiary amine catalyst for the production of strong tough flame-retardant cured products, said blend comprising (1) at least 50 parts by weight of a polyglycidyl ether of a polynuclear phenol having a plurality of bromo groups directly attached to nuclear carbon atoms, said ether being free from functional groups other than hydroxyl and epoxy groups, (2) about 20 to 30 parts of a liquid aliphatic polyglycidyl ether, and (3) about 10 to 20 parts of a liquid epoxycyclohexane resin.

3. A two-part, self-curing liquid composition, each part of which by itself remains liquid for at least 6 months at room temperature, which two parts can be stirred together at room temperature to provide a liquid blend of less than 80,000 cps. viscosity which cures with substantially no evolution of volatiles to a strong tough flame-retardant state, one of said two parts including epoxy resin,
a major proportion by weight of which epoxy resin is polyglycidyl ether of a polynuclear phenol having a plurality of bromo groups directly attached to nuclear carbon atoms, said ether being free from functional groups other than hydroxyl and epoxy groups, and
a minor proportion of which is a mixture of liquid aliphatic polyglycidyl ether and liquid epoxycyclohexane resin;
the other of said two parts including
polycarboxylic acid anhydride having a melting point not greater than 40° C., and
a catalyst for epoxy resin-anhydride reactions in such amount that said two-part liquid composition is substantially cured within 16 hours at 150° C., and
said composition having 0.5 to 2 anhydride groups per epoxy group.

4. A two-part, self-curing liquid composition, each part of which by itself remains liquid for at least 6 months at room temperature, which two parts can be stirred together at room temperature to provide a liquid blend of less than 80,000 cps. viscosity which cures with substantially no evolution of volatiles to a strong tough flame-restardant state, one of said two parts comprising a stable blend of epoxy resin
at least 50 parts by weight of which epoxy resin is a polyglycidyl ether of a polynuclear phenol having a plurality of bromo groups directly attached to nuclear carbon atoms, said ether being free from functional groups other than hydroxyl epoxy groups,
about 20 to 30 parts of which is a liquid aliphatic polyglycidyl ether, and
about 10 to 20 parts of which is a liquid epoxycyclohexane resin;
the other of said two parts comprising
polycarboxylic acid anhydride having a melting point not greater than 40° C., and
a catalyst for epoxy resin-anhydride reactions in such amount that said two-part liquid composition is substantially cured within 16 hours at 150° C., and
said composition having 0.5 to 2 anhydride groups per epoxy group.

5. A two-part, self-curing liquid composition, each part of which by itself remains liquid for at least 6 months at room temperature, which two parts can be stirred together at room temperature to provide a liquid blend of less than 80,000 cps. viscosity which cures with substantially no evolution of volatiles to a strong tough flame-retardant state, one of said two parts including epoxy resin,
a major proportion by weight of which epoxy resin is polyglycidyl ether of a polynuclear phenol having a plurality of bromo groups directly attached to nuclear carbon atoms, each ether being free from functional groups other than hydroxyl and epoxy groups, and
a minor proportion of which is a mixture of liquid aliphatic polyglycidyl ether and liquid epoxycyclohexane resin;
the other of said two parts including
a polycarboxylic acid anhydride adduct of maleic anhydride and olefin, which adduct has a melting point not greater than 40° C., and
a catalyst for epoxy resin-anhydride reactions in such amount that said two-part liquid composition is substantially cured within 16 hours at 150° C., and
said composition having 0.5 to 2 anhydride groups per epoxy group.

6. A two-part, self-curing liquid composition, each part of which by itself remains liquid for at least 6 months at room temperature, which two parts can be stirred together at room temperature to provide a liquid blend of less than 80,000 cps. viscosity which cures with substantially no evolution of volatiles to a strong tough flame-retardant state, one of said two parts comprising a stable blend of epoxy resin
at least 50 parts by weight of which epoxy resin is a polyglycidyl ether of a polynuclear phenol having a plurality of bromo groups directly attached to nuclear carbon atoms, said ether being free from functional groups other than hydroxyl and epoxy groups,
about 20 to 30 parts of which is a liquid aliphatic polyglycidyl ether, and
about 10 to 20 parts of which is a liquid epoxycyclohexane resin;
the other of said two parts comprising
a liquid polycarboxylic acid anhydride adduct of maleic anhydride and olefin, and
a catalyst for epoxy resin-anhydride reactions in such amount that said two-part liquid composition is substantially cured within 16 hours at 150° C., and
said composition having 0.5 to 2 anhydride groups per epoxy group.

7. A composition as defined in claim 3 wherein the brominated polyglycidyl ether is the polyglycidyl ether of 2,2-bis(4-hydroxy-3,5-dibromophenyl)propane.

8. An article of manufacture including a strong tough flame-retardant resinous component comprising the cured composition of claim 3.

(References on following page)

References Cited by the Examiner

UNITED STATES PATENTS

| | | | |
|---|---|---|---|
| 2,548,447 | 4/1951 | Shokal et al. | 260—47 |
| 2,801,227 | 7/1957 | Goppel | 260—47 |
| 2,824,083 | 2/1958 | Parry et al. | 260—42 |
| 2,935,488 | 5/1960 | Phillips et al. | 260—42 |
| 2,951,778 | 9/1960 | Haberlin | 260—42 |
| 3,016,362 | 1/1962 | Wismer | 260—830 |
| 3,031,434 | 4/1962 | Radlove | 260—47 |
| 3,051,665 | 8/1962 | Wismer et al. | 260—2.5 |
| 3,058,946 | 10/1962 | Nametz | 260—830 |

OTHER REFERENCES

Skeist, "Epoxy Resins," Reinhold Publishing Corp., New York, 1958, pages 16 and 47 relied upon.

Weiss, Anhydride Curing Agents for Epoxy Resins, Industrial and Engineering Chemistry, 49 (7), July 1957, pp. 1089–1090.

MURRAY TILLMAN, *Primary Examiner.*

DANIEL ARNOLD, JAMES A. SEIDLECK, LEON J. BERCOVITZ, *Examiners.*